United States Patent [19]

Harbeke

[11] Patent Number: 4,916,800
[45] Date of Patent: Apr. 17, 1990

[54] FIRE-RETARDANT FLUID COUPLING ASSEMBLY AND METHOD

[76] Inventor: Gerold J. Harbeke, 2807 S. Military Trail, West Palm Beach, Fla. 33415

[21] Appl. No.: 375,995

[22] Filed: Jul. 6, 1989

Related U.S. Application Data

[63] Continuation of Ser. No. 116,174, Nov. 3, 1987, abandoned.

[51] Int. Cl.$^4$ .............................................. E04C 2/00
[52] U.S. Cl. .................................... 29/469; 29/525.1; 52/232; 52/745
[58] Field of Search ....................... 29/447, 469, 525.1; 52/232, 741, 745; 53/399, 472; 138/103, 110, 96 R

[56] References Cited

U.S. PATENT DOCUMENTS

| | | |
|---|---|---|
| 4,221,092 | 9/1980 | Johnson . |
| 4,467,577 | 8/1984 | Licht ................................. 52/232 X |
| 4,608,807 | 9/1986 | Skripalle .............................. 53/399 |
| 4,642,956 | 2/1987 | Harbeke . |
| 4,748,787 | 6/1988 | Harbeke ............................ 52/232 X |

OTHER PUBLICATIONS

3M—Publication—Fire Barrier Restricting Collar RC.

Primary Examiner—Joseph M. Gorski
Attorney, Agent, or Firm—Griffin, Branigan & Butler

[57] ABSTRACT

A pipe coupling assembly (10, 46, 64) and method of manufacturing the same involves the use of a pipe coupling (12, 50, 66) with an intumescent collar (14, 68) and a metallic band (16, 56, 70) wrapped thereabout at one end thereof. The metallic band has overlapping ends (36, 38) which are held together by elongated fasteners (18, 60) passing through overlapping portions and into the intumescent wrap. The pipe coupling assembly including a tubularly-shaped main body, an intumescent collar, and a metallic band are assembled as a unit in a factory to be later placed in a concrete form to have concrete poured thereabout. A heat receiving edge of the metallic band receives heat from a fire in a space below a barrier in which the pipe coupling assembly is embedded and conducts it to the outer periphery of the intumescent collar.

5 Claims, 1 Drawing Sheet

FIRE-RETARDANT FLUID COUPLING ASSEMBLY AND METHOD

This is a continuation application of Ser. No. 07/166,174 filed Nov. 3, 1987 and now abandoned.

This invention relates generally to art of pipe networks for buildings, and especially to apparatus and systems for making pipe networks more fire-retardant.

Until recently, pipe networks were normally extended through floors of buildings by forming holes in the floors—e.g. by using void-forming devices during "pouring" of the floors, by knocking out holes, by boring such holes after the floors have been formed, etc.—and thereafter extending pipes through these holes. Normally, the holes were made to be bigger than the pipes to ensure that one could easily extend the pipes through the holes. Thereafter, it was necessary for workmen to fill these spaces between the pipes and the holes with grout or some other substance in order to meet fire codes which generally do not allow unfilled holes in floors.

There have been a number of patents issued, such as German Patent No. 2,615,428, U.S. Pat. Nos. 4,453,354 to Harbeke and 4,261,598 to Cornwall disclosing the concept of cementing pipe coupling joints into floors when floors are poured and thereafter mating external pipes to female opposite ends of the embedded coupling joints. Such practice is normally carried out with plastic pipe, however, it could also be carried out with pipes made of other materials.

A major problem which still existed for pipe coupling joints which were embedded in floors was that when there was a fire the fire would melt the external plastic pipe and would then pass up through the pipe-coupling joints to the next floor. In other words, the pipe-coupling joints themselves served as ventilation holes for fires. U.S. Pat. No. 4,642,956 to Harbeke solved this major problem by disclosing the concept of wrapping intumescent-material collars about pipe coupling joints and then pouring wet concrete in forms about the couplings and the intumescent collars. Although the method and apparatus disclosed by Harbeke in U.S. Pat. No. 4,642,956 provides vast improvements over those systems which already existed, there are additional improvements which could be made.

One problem with the Harbeke system of U.S. Pat. No. 4,642,956 is that it is rather difficult for plumbers and other construction workers to form collars with intumescent material which they attached to couplings prior to the couplings being cemented into barriers. Also, it is difficult to prepackage couplings with intumescent wrap because intumescent material is subject to damage with rough handling. It is therefore an object of this invention to provide a pipe coupling assembly with an intumescent collar which is sturdy and resistent to damage caused by blows and rough handling and which can therefore be prepackaged prior to the transportation and sale.

Another difficulty with the fire-retardant fluid coupling assembly and method described by Harbeke in U.S. Pat. No. 4,642,956 is that the intumescent collar does not respond as quickly as is possible to the heat of a fire because such fire heat is absorbed or conducted away, by the surrounding concrete. Thus, it is an object of this invention to provide a pipe coupling assembly having an intumescent-material collar which responds quickly to heat to close off the pipe coupling in case of fire in a floor below.

It is a further object of this invention to provide a pipe coupling assembly having an intumescent-material collar which is easy and relatively inexpensive to construct, but yet pleasing in appearance, quite durable, and effective in responding to heat.

SUMMARY

According to principles of this invention, a pipe coupling assembly product includes a tubularly-shaped main body with an intumescent collar wrapped thereabout at a first end thereof and a closed metallic band wrapped about the intumescent collar. A heat reception edge of the metallic band is approximately aligned with the first end of the tubularly-shaped main body. The metallic band is comprised of a strip whose ends are attached to one another by fasteners which pass through the metallic-band ends into the intumescent collar. The metallic band is pulled tightly to cause the intumescent collar to close tightly on the tubular-shape main body to be held thereon by friction. The metallic band serves to protect and hold the intumescent collar together and provides a heat conductor at the circumferential surface of the intumescent collar.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
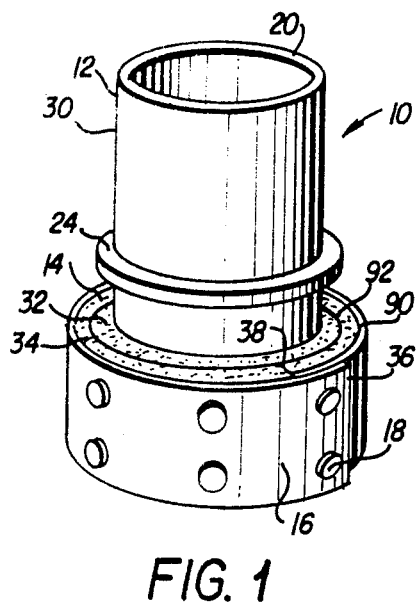
FIG. 1 is an isometric view of a pipe coupling assembly according to principals of this invention.
Figure 2:
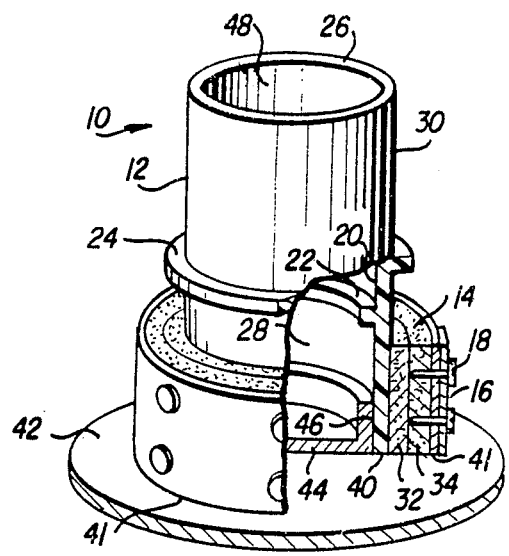
FIG. 2 is an isometric, partially cutaway view of the assembly shown in FIG. 1 but mounted on a wooden form.

Referring now to FIGS. 1 and 2, a pipe coupling assembly 10 comprises a tubularly shaped pipe coupling 12, an intumescent collar 14 wrapped thereabout, a metallic band 16 wrapped about the intumescent collar 14, and elongated rivets 18.

The pipe coupling 12 has a tubularly shaped main body 20 with an internal shoulder 22 (FIG. 2) and an external riser flange 24. The internal shoulder 22 comes into contact with ends of pipes inserted into opposite ends 26 and 28 of the main body 20 to form a stop therefor. The external riser flange 24 protrudes from an outer surface 30 so as to form a lock with concrete in which the pipe coupling assembly 10 is embedded.

The intumescent collar 14 is shown in FIGS. 1 and 2 as being formed of two layers of wrap 32 and 34—the intumescent collar can be formed of one or more layers depending of the size of the pipe and the layers—and in the preferred embodiment, the intumescent fire proofing collar 14 is formed of materials sold under the designation fire barrier wrap/strip FS195 manufactured 3M of St. Paul, Minn., however, other materials currently manufactured by 3M or others can also be used. The metallic band 16 can be of a galvanized steel. The band 16 is formed of a strip which is bent into a circle so that ends 36 and 38 thereof overlap one another to form a complete ring. The method of constructing the pipe coupling assembly 10 is that the intumescent collar 14 is placed about the pipe coupling 12 with its lower edge at the lower end 40 of the pipe coupling 12 and the metallic band 16 is then wrapped about the outer surface of the intumescent collar with its lower, heat-receiving edge 41, at the lower end of the pipe coupling 12 and with the ends thereof 36 and 38 being caused to overlap. These ends, 36 and 38, are pulled tight so as to close the metallic band 16 tightly about the intumescent material thereby forcing the intumescent collar 14 against the outer surface of the pipe coupling 12 and causing it to be held thereto by friction. An adhesive could be used as well. Thereafter, elongated rivets 18 are passed through the metallic bands 16 at the overlapping areas to hold the band in the tight ring shape. These elongated rivets 18 are long so that they penetrate relatively deeply into the intumescent collar 14 as can be seen in FIG. 2, thereby fastening the metallic band 16 to the intumescent collar 14 and also forming heat conductors from the metallic band 16 into the intumescent collar 14.

The pipe coupling assembly 10 is shown in FIG. 2 frictionally held to a wooden concrete form 42 by means of an internal cup mounting member 44 which is screwed or otherwise fastened to the wooden concrete form 42. In this respect, the cup mounting member 44 has a peripheral surface 46 which makes frictional contact with the internal surface 48 of the pipe coupling 12. It should be understood that the pipe coupling assembly 10 is assembled in a factory and shipped and used as a unit.

Figure 3:
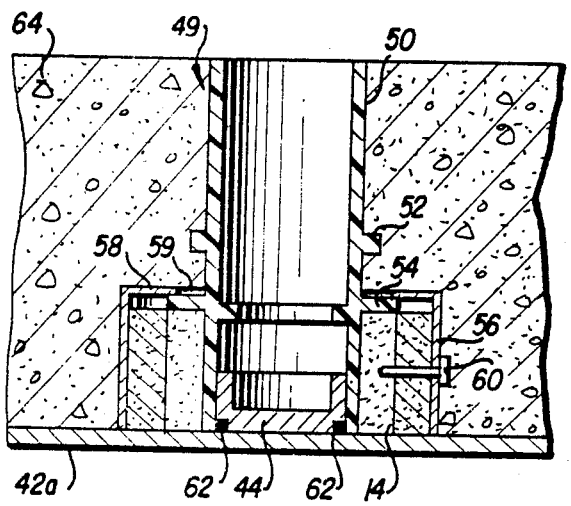
FIG. 3 is a side sectional view of another embodiment of this invention mounted on a wooden concrete form with concrete therein.

The alternate embodiment of FIG. 3 differs from the embodiment of FIGS. 1 and 2 in that a pipe coupling 50 thereof includes both a riser flange 52 and a metal-band mounting flange 54 on the outer surface thereof. Also, in this embodiment a metal band 56 which surrounds an intumescent collar 14 is not formed of overlapping end members which are fastened together, but rather is a continuous cup with an upper, inwardly-directed, horizontal lip 58. The horizontal lip 58 rests on top of the metal-band mounting flange 54 to hold the metal band 56 on the pipe coupling 50. A round opening 59 defined by the horizontal lip is sufficiently large to pass over the riser flange 52 but not over the metal-band mounting flange 54. In this case, metallic screws 60 are passed through the wall of the metal band 56 into the intumescent collar 14 to serve as a heat conductor and also to firmly fasten the metal band 56 to the intumescent collar 14. The metal-band mounting flange 54 is clamped between the upper surface of the intumescent collar 14 and the lower surface of the horizontal lip 58 to firmly hold the metal band 56 and the intumescent collar 14 to the pipe coupling 50. The pipe coupling assembly 49 is shown held to a metallic concrete form 42a by means of the cup mounting member 44 which is welded at 62 to the concrete form 42a. Concrete 64 is shown in FIG. 3 in the concrete form 42 surrounding the pipe coupling assembly 49.

Figure 4:
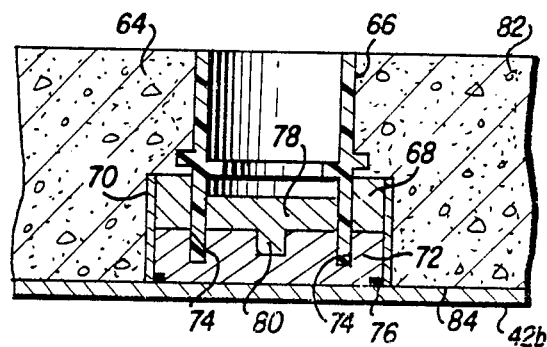
FIG. 4 is a side sectional view of another embodiment of this invention mounted on a metallic concrete form with concrete therein.

In the embodiment of FIG. 4, a pipe coupling assembly 64 comprises a pipe coupling 66, an intumescent collar 68 and a metallic band 70. In this case, the pipe coupling 66 is held to a metallic tunnel form 42b by a mounting device 72 having an annual slot 74 therein. The mounting device 72 is fastened to the metallic tunnel concrete form 42b by means of a weld 76 and also includes a secondary member 78 which is keyed to the mounting device 72 by a protrusion 80.

The pipe coupling 66 is retained in the annular slot 74 of the mounting device 72 by means of friction and the secondary member 78 which is coupled to the pipe coupling 66 by friction, provides additional support for the pipe coupling 66. When the form 42 is removed from a cured concrete barrier 82 the mounting device 72, which is attached to and part of the concrete form 42 goes with the concrete form 42, while the secondary member 72, which is gripped by an internal surface of the pipe coupling 66 by means of friction, stays with the pipe coupling 66. As in the other embodiments, the intumescent collar 68 is fastened to the pipe coupling 66 and the metallic band 70 is fastened to the intumescent collar 68. In the FIG. 4 embodiment, the intumescent collar 68 is shown attached to the pipe coupling 66 by means of an adhesive and the metallic band 70 is shown attached to the intumescent collar 68 by means of an adhesive. In this embodiment, the metallic band 70 is longer than the intumescent collar 68 so that it can extend down to a lower surface 84 of the concrete barrier 82 in order to conduct heat from the lower surface 84 up to the intumescent collar 68 once the mounting device 72 is removed. It should be understood that the metallic band 70 could be of a size for only covering the circumferential surface of the intumescent collar 68, however, if this were the case, it would take longer for the intumescent collar to receive heat from a fire on the floor below the concrete barrier 82.

In operation of all the described embodiments of this invention, the intumescent collars and metallic bands are placed on pipe couplings at a factory and these pipe coupling assemblies are then shipped and sold as units. The metallic bands serve as protectors for the intumescent collars during transportation and use and force the intumescent collars tightly against the pipe couplings. At construction sites, these pipe coupling assemblies are mounted on concrete forms with the metallic bands thereof extending to the forms. When the forms are removed from cured barriers the edges of the metallic bands are exposed to the spaces below the barriers. If there are fires in the spaces below the barriers the exposed edges of the metallic bands receive the heat therefrom and conduct it throughout the metallic bands faster than surrounding concrete can conduct the heat away from the metallic bands. Thus, the metallic bands become hot and, in turn, heat the intumescent collars they surround.

The metallic fasteners extending through the metallic bands into the intumescent collars also become heated and conduct heat into the intumescent collars, thereby heating them faster.

It should be appreciated by those of ordinary skill in the art that the pipe coupling assemblies described herein can be easily manufactured in a factory to have a clean smooth appearance and can thereafter be shipped, stored, and used without undue fear of damaging the intumescent collars. In this respect, the metallic bands cover the outer circumference and thereby protect the intumescent collars from damage. Further, in some embodiments, the metallic band causes the metallic wrap to be tightly pressed against the outer surface of the pipe coupling so that the intumescent collar is held to the pipe coupling by friction.

It will also be appreciated by those of ordinary skill in the art that the pipe coupling assembly of this invention will quickly respond to the heat of fire from a space below a barrier in which the pipe coupling assembly is embedded to close off the pipe coupling. Still further, it will be appreciated by those of ordinary skill in the art that the manner of manufacturing the pipe coupling assembly of FIGS. 1 and 2 allows, in one step, the fastening of an intumescent collar to a pipe coupling and a metallic band to an intumescent collar.

While the invention has been particularly shown and described with reference to a preferred embodiment, it will be understood by those skilled in the art that various changes in form and detail may be made therein without departing from the spirit and scope of the invention. For example, it would be possible to have numerous fasteners passing through the metallic band and into the intumescent wrap to serve as a heat conductor, the heads thereof being shown in FIGS. 1 and 2. Such fasteners need not be utilized to fasten the ends of the metallic band together but being used rather only as heat conductors. It would also be possible to make the metallic band with internal protrusions in place of such fasteners. Further, it would be possible to include an adhesive between the intumescent collars and the pipe couplings to ensure that these members do not come apart. Still further, rather than the pipe couplings including internal shoulders, they could have bells at the ends thereof for receiving pipes. One bell could be extremely long so that it could be cut off to fit various-thickness barriers. Also, the exposed edges of the metallic bands could include flanges for picking up heat faster. Further, the cup mounting member 44 of FIG. 3 could also be mated with a secondary member of the type identified in FIG. 4 by reference numeral 78 where the metallic form 42a is a tunnel type, not allowing much clearance when it is pulled from the concrete. Also, a top edge 90 of the metallic band 16 (FIG. 1) could be slightly, around ¼ inch, below a top edge 92 of the intumescent collar 14 to avoid excess heat transfer above the intumescent material. Still further, a bottom edge of the metallic band could be turned inwardly, or include inwardly turned tabs, to provide additional support and containment to intumescent material and/or additional heat transfer.

The embodiments of the invention in which an exclusive property or privilege are claimed are defined as follows:

1. A method of constructing a pipe coupling assembly product at a factory separate from an installment site and then transporting the pipe coupling assembly product to said installment site for permanent engagement with other pipes, said method comprising the steps of:
    at said factory, choosing a pipe coupling having an elongated tubularly-shaped main body with opposite first and second ends and inner and outer surfaces;
    at said factory, wrapping an intumescent collar about the outer surface of said tubularly-shaped main body near the first end thereof with a corresponding first end edge of said intumescent collar being adjacent said first end of said elongated tubularly-shaped main body, said intumescent collar being constructed of a material which expands when it gets hot to close off the inner surface of said tubularly-shaped main body;
    at said factory, placing a metallic band about the circumferential periphery of said intumescent collar, said metallic band having one heat receiving edge extending to the end of said elongated tubularly-shaped main body at which said intumescent collar is wrapped but leaving said first end edge of said intumescent collar at least partially uncovered;
    at said factory, fastening said metallic band to said intumescent collar and said intumescent collar to the outer surface of said tubularly-shaped main body thereby forming said pipe coupling assembly product;
    shipping said pipe coupling assembly product as a unit from said factory to said installment site for permanent engagement with other pipes;
    thereby forming a pipe-coupling assembly product at said factory separate from said installment site, which is then shipped and stored as a unit and which can be later placed at said installment site and attached to a concrete form, with wet concrete being poured into said form about said pipe coupling assembly product and allowed to cure around said pipe coupling assembly product to form a barrier, the form being thereafter removed from said barrier and pipes being attached to opposite ends of the tubularly-shaped main body with the first end of the intumescent collar and the heat receiving edge of the metallic band being exposed at a surface of said barrier to form a fire proof pipe string.

2. The method of making the pipe-coupling assembly product as in claim 1 wherein the step of placing said metallic band about the circumferential periphery of the intumescent collar comprises wrapping a metallic band having first and second ends about said intumescent collar so that said first and second ends overlap one with the other, and then inserting a fastener through both end portions thereby holding said end portions together and forming a ring of said metallic band about said intumescent collar, said fastener extending into the intumescent collar, thereby fastening said metallic band to said intumescent collar.

3. The method of making the pipe-coupling assembly product as in claim 2 wherein said fastener is constructed of metal, thereby forming a heat conductor from said metallic band into said intumescent collar.

4. The method of making the pipe-coupling assembly product as in claim 3 wherein is included the step of mounting additional protrusions on said metallic band extending into said intumescent collar.

5. The method of making the pipe-coupling assembly product as in claim 1 wherein the step of placing said metallic band about the circumferential periphery of the intumescent collar comprises the steps of wrapping a metallic band having first and second ends about said intumescent collar so that said first and second ends overlap with one another, and then fastening the two overlapping end portions one with the other.

* * * * *